Patented Mar. 13, 1923.

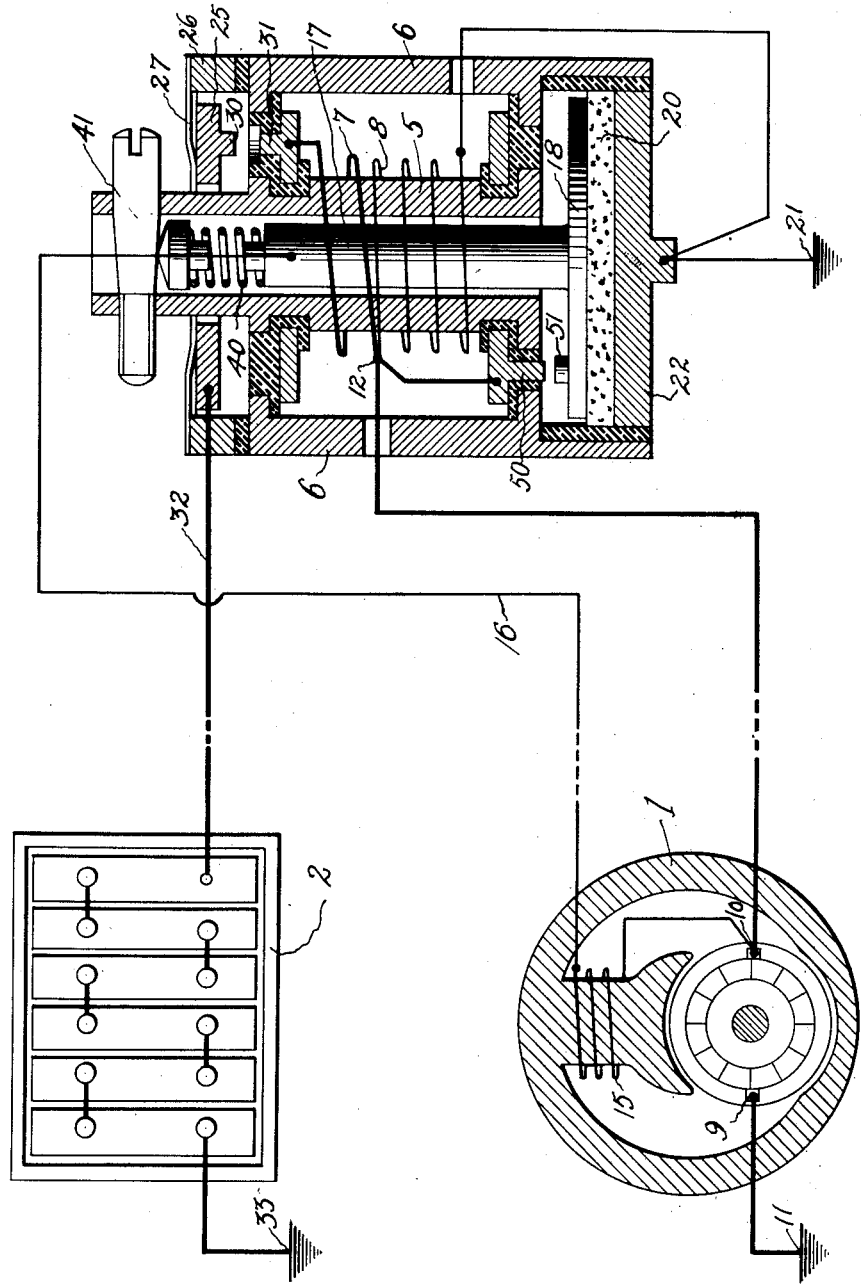

1,448,484

UNITED STATES PATENT OFFICE.

GUIDO FORNACA, OF TURIN, ITALY.

GENERATOR AND BATTERY CONTROL.

Application filed January 12, 1920. Serial No. 351,064.

(GRANTED UNDER THE PROVISIONS OF THE ACT OF MARCH 3, 1921, 41 STAT. L., 1313.)

*To all whom it may concern:*

Be it known that I, GUIDO FORNACA, a subject of the King of Italy, residing at Turin, in the Province of Piedmont, Italy, have invented certain new and useful Improvements in Generator and Battery Controls (for which I have filed an application in Italy, April 8, 1918, Patent No. 482/13), of which the following is a specification.

This invention relates to apparatus for regulating the voltage of a generator and interrupting a related circuit when the voltage of the generator drops below a certain minimum value. The invention is specially adapted for use in connection with automobiles to stabilize the voltage of the generator charging the battery and to control the circuit between the battery and generator and the object of the invention is to combine the voltage regulating and circuit control means for improved operation or both.

Further objects of the invention in also attaining simplicity and compactness and efficiency will appear from the following description taken in connection with the accompanying drawing showing a diagram of one embodiment of the invention as applied to a generator and battery of an automobile.

In the drawing 1 is a generator driven by the automobile engine, and 2 is a battery of cells to be charged by the generator 1. If the generator voltage impressed on the battery terminals is too high the cells will be injured by too sudden charging; if the voltage is too low, as for instance below a normal twelve volts, the battery will discharge instead of charging. To regulate the generator voltage and disconnect the generator-battery circuit when this voltage is too low this invention provides the apparatus shown on enlarged scale at the right of the drawing.

In the embodiment of the invention shown a hollow core 5 in a cylinder 6, both of magnetic material, supports an upper solenoid winding 7 of few turns and large cross section and a lower winding 8 of many turns of fine wire. The brushes 9, 10 of the generator are connected respectively to a ground at 11 and the coils 7, 8 at 12 and the shunt field 15 of the generator is connected by wire 16 with a spindle 17 of magnetic material in the core 5. The disk 18 at the lower end of spindle 17 rests on the pile of carbon granules 20 grounded at 21 through the bottom plate 22 of brass or other non-magnetic material. When the generator is running at low tension current of small amperage passes from brush 10 through high resistance coil 8 and any resistance desired in series with it to the ground at 21 and 11 to brush 9 and current also passes through the field 15 to spindle 17, disk 18, resistance 20 and ground at 21 and 11 to brush 9.

As the voltage at the brushes rises the current in coil 8 increases augmenting the magnetism in core 5 and cylinder 6 and drawing down on the floating disk 25 of magnetic material. The disk 25 is suspended from ring 26 by the bow spring 27 and the tension of this spring and attraction of the coil 8 are such that when the brush voltage has increased to the charging point the disk 25 will be drawn down onto the core 5 and cylinder 6 completing the magnetic circuit and making contact at 30, 31 to connect the battery 2 in circuit with the generator from brush 10 through coil 7, wire 32, battery 2 and grounds 33 and 11 to brush 9.

The coil 7 is wound in such direction as to increase the magnetic pull on the disk 25 so long as a charging current is flowing. When however, the voltage of the generator drops so low that the battery begins to discharge a current opposite in direction will flow in coil 7 decreasing the pull of the magnetism on disk 25 and permitting spring 27 to lift the disk and interrupt the generator-battery circuit so as to prevent discharge of the battery.

In order to maintain the generator voltage as nearly constant as possible at the proper charging value and prevent overcharging, the strength of the field current is varied inversely to the voltage by movement of disk 18 against the carbon granules 20, so that a high brush voltage tends to weaken the field and vice versa. Within core 5 and above spindle 17 is the spring 40 adjusted in pressure by the conical bolt 41 and acting to press downward on the spindle 17 and the disk 18 which are in the lower magnetic circuit of the core 5 and cylinder 7 and are pulled upward thereby against the tension of spring 40. As the generator voltage and magnetism of core 5 increase, the pressure of disk 18 on granules 20 decreases increasing the resistance of these granules and lowering the current through field 15 to prevent further undue rise in generator voltage. Similarly the parts work, when the voltage decreases, to prevent an excessive drop in voltage and the final effect is to stabilize the generator voltage holding it within small limits for comparatively great variation in generator speed. To protect the system from injury due to excessive current, as may happen for instance when the driving engine runs wild, the contact 50 is provided to be engaged by the lug 51 on disk 18 when the latter is drawn upward by the strong magnetism set up by the excessive current. Engagement of contacts 50, 51 short circuits and practically nullifies the field 15 at 12, 50, lowers the generator voltage and greatly decreases the current in the coil 8 since current from generator brush 10 will flow to 12, through contacts 50, 51, carbon resistance 20 to grounds 21 and 11 and brush 9 rather than through the greater resistance of the winding 8. The decrease in voltage and the cutting out of coil 8 reduces the pull of the magnet and permits spring 27 to draw up disk 25 breaking the connection between the generator and battery. The reduction in magnetic flux also permits the spring to again press the disk 18 down into contact with the granules 20 breaking the contact at 50, 51 and reestablishing normal conditions.

In the apparatus of this invention the coils 7 and 8 operate cumulatively during charging to hold down the disk 25 and raise disk 18; if the current reverses they operate differentially or in bucking relation the coil 7 then tending to permit the disk 25 to be raised and the disk 18 to be lowered. By this combination of these coils in the apparatus shown the total control of the charging of the battery is attained in a simple and efficient manner. The controlling devices are all combined together in compact manner permitting the control to be positioned conveniently out of the way and all the movable parts are enclosed within the cylinder 6 in a securely protected manner. There are no delicate adjustments to be maintained and when the movable parts function they do so in a strong and sure manner maintaining the contacts under the desired pressure or breaking them completely. All of these advantages make for robustness and durability in service particularly adapting the apparatus for use on automobiles.

I claim:—

The combination with a generator and a battery to be charged thereby, of an electromagnet supplied with current from said generator, a resistance in the field curcuit of said generator, and an armature disk for said magnet moving to control said resistance and thereby control the current through the field of said generator and adapted to short circuit said field upon excessive rush of current.

Ing. GUIDO FORNACA.